US006968386B1

(12) United States Patent
Benayoun et al.

(10) Patent No.: US 6,968,386 B1
(45) Date of Patent: Nov. 22, 2005

(54) SYSTEM FOR TRANSFERRING DATA FILES BETWEEN A USER WORKSTATION AND WEB SERVER

(75) Inventors: Alain Benayoun, Cagnes sur Mer (FR); Patrick Michel, La Gaude (FR); Jean-Francois Le Pennec, Nice (FR); Claude Pin, Nice (FR)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 09/660,043

(22) Filed: Sep. 12, 2000

(30) Foreign Application Priority Data

Dec. 1, 1999 (EP) ................................ 00480015

(51) Int. Cl.[7] ...................... G06F 15/167; G06F 15/16; H04B 1/38; H04L 5/16

(52) U.S. Cl. ...................... 709/231; 375/219; 375/220; 375/222; 375/295; 375/316; 709/212; 709/250; 709/217; 709/219; 709/227; 709/232; 709/253; 710/308; 710/313; 711/147; 711/149

(58) Field of Search ............................... 709/217, 219, 709/227, 231, 232, 250, 253, 212; 711/147, 711/149

(56) References Cited

U.S. PATENT DOCUMENTS

| | | | | |
|---|---|---|---|---|
| 4,570,217 | A * | 2/1986 | Allen et al. | 700/83 |
| 5,795,297 | A * | 8/1998 | Daigle | 600/447 |
| 6,157,955 | A * | 12/2000 | Narad et al. | 709/228 |
| 6,526,446 | B1 * | 2/2003 | Yang et al. | 709/230 |

* cited by examiner

*Primary Examiner*—Valencia Martin-Wallace
*Assistant Examiner*—Azizul Choudhury
(74) *Attorney, Agent, or Firm*—John R. Pivnichny; Dillon & Yudell LLP

(57) ABSTRACT

System for transferring a data file from a web server to a user workstation through a network and reciprocally, the user workstation including a hard disk (205) for storing the data file being transferred over a SCSI bus (208). The user workstation includes a dual-port memory (304) for storing temporarily the data file, a network logic unit (302) interconnected between the network and the input port of the dual-port memory for receiving the data file from the network and transmitting it to the dual-port memory, and a SCSI logic unit (303) interconnected between the output port of the dual-port memory and the SCSI bus for transferring the data file from the dual-port memory to the hard disk over the SCSI bus and reciprocally.

9 Claims, 5 Drawing Sheets

SYSTEM FOR TRANSFERRING DATA FILES BETWEEN A USER WORKSTATION AND WEB SERVER

BACKGROUND OF THE INVENTION

1. Technical Field

The present invention relates to file transfer applications between a user workstation and a web server wherein the workstation is connected to the web through a Local Area Network (LAN) or a Wide Area Network (WAN), and relates particularly to a system for transferring data files between a user workstation and a web server.

2. Background

The transfer of data files between a web server and a user workstation is done using applications such as a web browser or a file transfer user software. Such a software involves a transfer protocol such as Hypertext Transfer Protocol (HTTP) used when the web browser transfers data files from remote web servers to graphically display the web contents on the monitor of the workstation.

Although HTTP Is adapted for downloading HTML files and the small bit maps displayed with them, it is not designed for transferring large data files. However, another protocol File Transfer Protocol (FTP) can download large files and resume transfer after interruptions. Insofar as transferring files via e-mail attachments is inefficient or impractical when dealing with large documents, FTP is the only open standard solution for efficiently posting new HTML pages onto a web site or sharing graphics laden files.

Many TCP/IP applications can run over Internet, most of them being user server applications. As each connection request is received, a user workstation process and a server process start. There may be several processes running simultaneously on both user workstation and server. To facilitate this process, each application (FTP for example) is assigned a unique address called a port. The related application is bound to this particular port. There are thousands of ports on a server or a user workstation that can be used. A standard port assignment is defined as a framework. For example FTP uses TCP port 21 and HTTP uses TCP port 80. Other values may be used for these applications when necessary.

Today, growing numbers of power users, telecommuters, and corporate Internet managers are unleashing the protocol's potential by using FTP users (file transfer software applications designed for users) to minimize time spent online. In fact, for anyone that even touches the Internet, "FTP user" should be spoken in the same breath as "e-mail" and "browser" when describing efficient desktop needs.

Web browsing or other internal applications are very often used when download of file is running and has impact on the performance of both the application and the file transfer and introduces delay and sometimes error. The main reason is that some resources are shared as the file transfer uses a lot of the internal hardware and software resources.

Therefore, there is a need to reduce the number of hardware and software resources located in the main processing system involved normally in the file download mechanism in order to improve the performance of both the file transfer and the other tasks running in the station.

SUMMARY OF THE INVENTION

Accordingly, the main object of the invention is to provide a system for connecting directly the network of a user workstation to the workstation hard disk and bypassing the main system bus, the main memory and the main processor in order to achieve a faster data file transfer and let other tasks run in the main processor to take advantages of all available resources.

The invention relates therefore to a system for downloading a data file from a web server to a user workstation through a network to which is connected the user workstation, this one including a hard disk for storing the data file being transferred over a SCSI bus. The user workstation includes a dual-port memory for storing temporarily the data file, a network logic unit interconnected between the network and the input port of the dual-port memory for receiving the data file from the network and transmitting it to the dual-port memory, and a SCSI logic unit interconnected between the output port of the dual-port memory and the SCSI bus for transferring the data file from the dual-port memory to the hard disk over the SCSI bus.

The invention relates also to a system for downloading a data file from a web server to a user workstation through a network to which is connected the user workstation, this one including a hard disk for storing the data file being transferred over a SCSI bus.

The user workstation includes a dual-port memory for storing temporarily the data file, a network logic unit interconnected between the network and the input port of the dual-port memory for receiving the data file from the network and transmitting it to the dual-port memory, and a SCSI logic unit interconnected between the output-port of the dual-port memory and the SCSI bus for transferring the data file from the dual-port memory to the hard disk over the SCSI bus.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
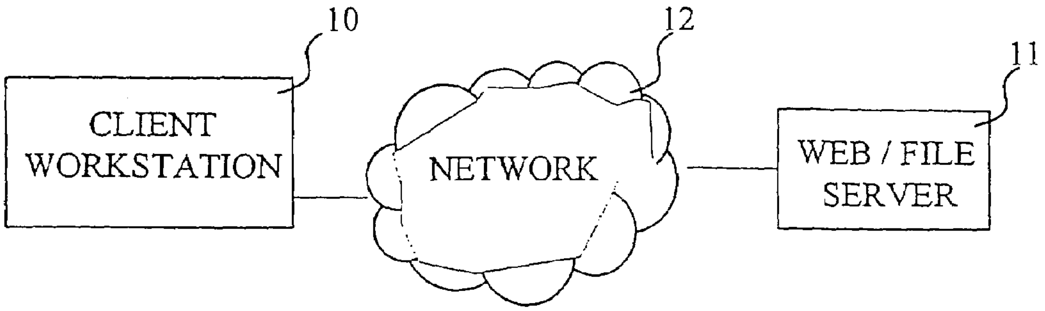
FIG. 1 is a schematic block-diagram representing the environment wherein a user workstation connects to a network by using a system according to the invention.
Figure 2:
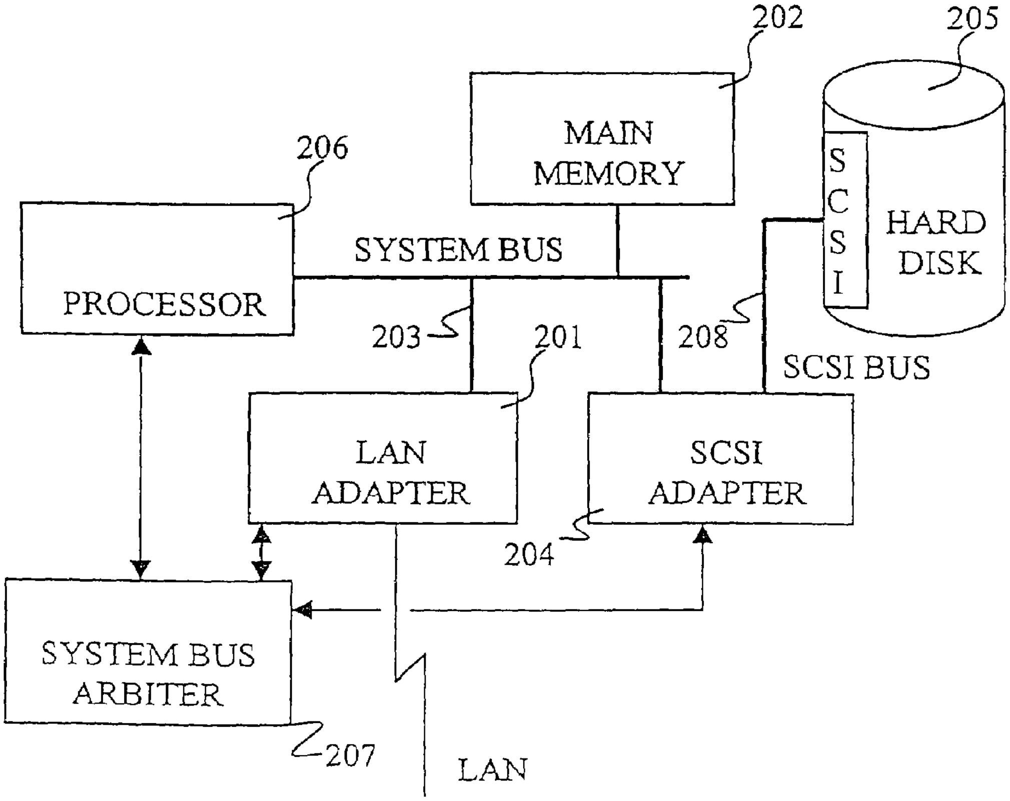
FIG. 2 is a block diagram representing the hardware components in a user workstation of the prior art.

The hardware architecture of a current user workstation is given in FIG. 2. With the current user workstation hardware design, the file transfer uses the following hardware components: a LAN (or WAN) adapter 201, a workstation main memory 202, a system bus 203, a SCSI master device adapter 204, a hard disk 205, a processor 206, a system bus arbiter 207, and the following software resources, a LAN adapter device driver, a SCSI adapter device driver, a user interface, an Operating System Stack IP and a file transfer protocol such as FTP are run by processor 206.

As a minimum the user workstation 10 is made of the processor 206, the main memory 202, the LAN adapter 201 and the SCSI adapter 204, all of them communicating through a common system bus 203. Therefore, the arbiter 207 is required to manage the bus allocation. The hard disk 205 is connected to the SCSI adapter 204 through an external SCSI bus 208. The SCSI adapter and bus may be easily replaced by another bus and drives technology such as IDE.

For a download file transfer the following operations take place:

once the connection is established, the file is received by the LAN adapter which transfers the data by bursts to the main memory through the system bus each burst is transferred from the main memory to the SCSI adapter through the system bus the SCSI adapter stores each burst in the hard disk through the SCSI bus these operations are repeated until the file is received.

It should be noted that each data transfer is controlled by the file transfer protocol run by the processor. From a hardware standpoint, the data transfers go through the main memory and the system bus. Therefore, during each data transfer, the processor stops its activity which degrades the performance of the user workstation.

Figure 3:
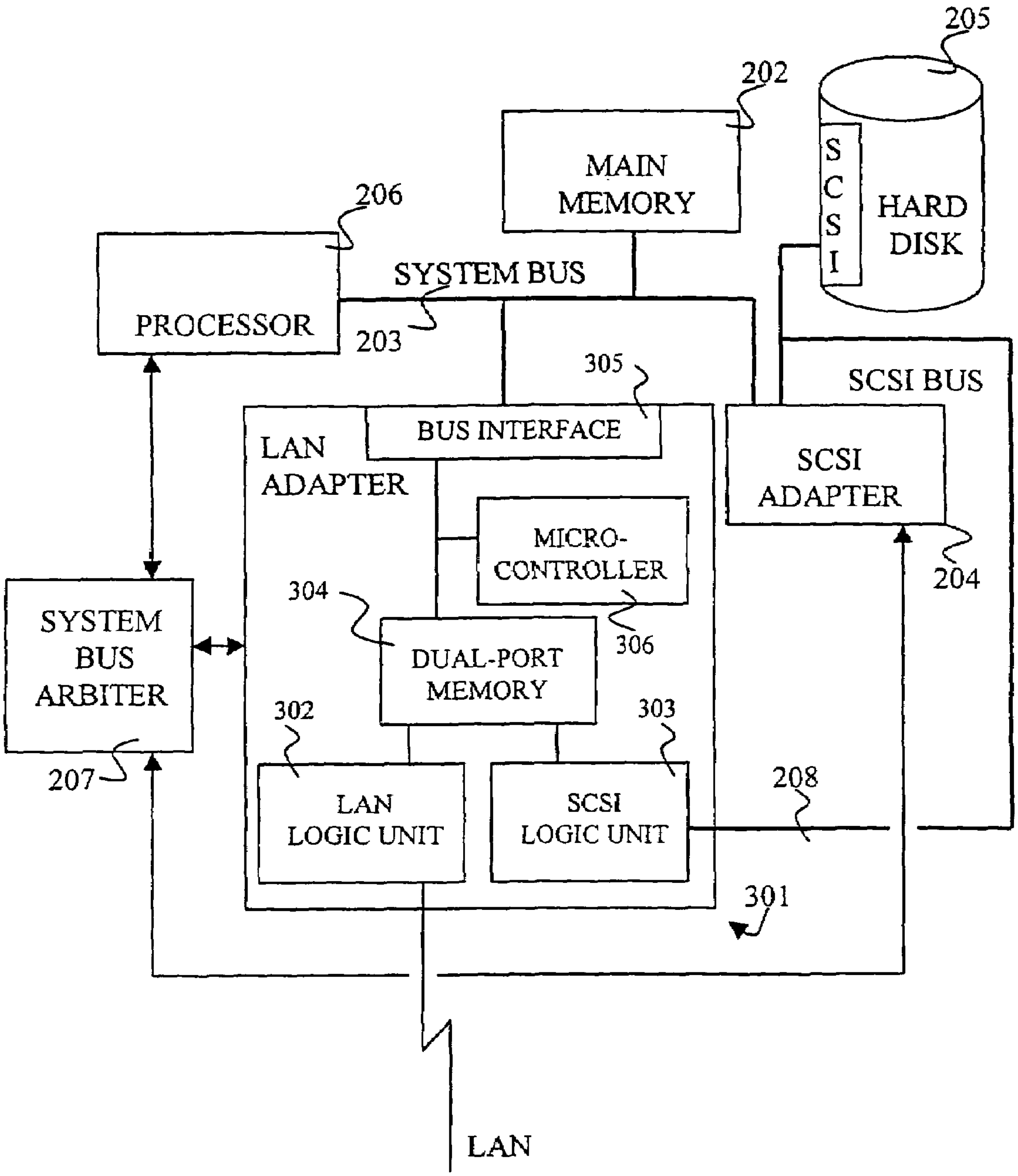
FIG. 3 is a block diagram representing the hardware components in a user workstation according to the invention.

FIG. 3 describes the new architecture of the user workstation according to the invention. It is based on a new LAN adapter 301 which implements a LAN logic unit 302, a SCSI controller 303, a dual-port memory 304, a system bus interface logic 305 and a microcontroller 306. A user workstation SCSI bus 208 connects a native SCSI adapter 204 and SCSI logic unit 303 to the hard disk 205.

It is assumed that TCP/IP is the standard protocol used in network operations. The type of operation to be performed is located in the so-called 'Port number' identifying the file transfer protocol to be used. The port scanning function only selects packets with the port number corresponding to the protocol handled by microcontroller 306. There is only one port assigned to an application at a time so this filtering allows to decide whether this packet is handled by microcontroller 306 and the local IP Stack implemented in the LAN adapter or by processor (206) and the main IP stack controlled by the Operating System. A further test which may be performed to avoid errors or bad frames is to check both Source and Destination IP address fields to verify that the frame belongs to a known flow and of course the sequence number to validate that the frame is the expected frame. These tests can be performed by microcontroller 306. The port scanning function analyses the port number and decides when to perform a file transfer operation. Depending on the port assignment, this file transfer takes place either through the system bus/main memory 203 or locally through the dual-port memory 304. In the latter case, the file transfer operations do not use anymore the main memory and the system bus, which improves the performance of the workstation. This new architecture is therefore open to any type of applications.

In the preferred embodiment, when the user requests the LAN adapter to handle a direct file transfer to memory, it first gives for download the flow identification to process locally. The identification may be the address source and destination and the port number which indicates also which transfer protocol is used. The micro-controller 306 is then able to detect such incoming flow (in case of download) on the LAN controller 302. The data packets are sent to the dual-port memory 304 on one port. The data stored in memory are, thanks to the SCSI controller 303, transferred from the other port of dual-port memory 304 to the hard disk (205) via SCSI BUS 208. The control packets for that flow are managed locally by micro-controller 306.

The upload mechanism is more simple since the user can just give the file location in memory and the destination for the file with a file transfer protocol to use. Micro-controller 306 initializes a file transfer session with the remote location, takes the file from hard disk 205 and puts it in dual-port memory 304 through SCSI BUS 208 and SCSI controller (303). This loading may be done packet by packet depending on the file size. This file splitted into packets is then sent from dual-port memory 304 to the LAN via LAN controller (302). All the data and control processes are managed by micro-controller 306.

It should be noted that the present invention applies to any type of file transfer protocols. As an example, the following protocols can be supported: File Transfer Protocol (FTP), Trivial File Transfer Protocol (TFTP), Network File Server (NFS), Hyper Text Transfer Protocol (HTTP).

Figure 4:
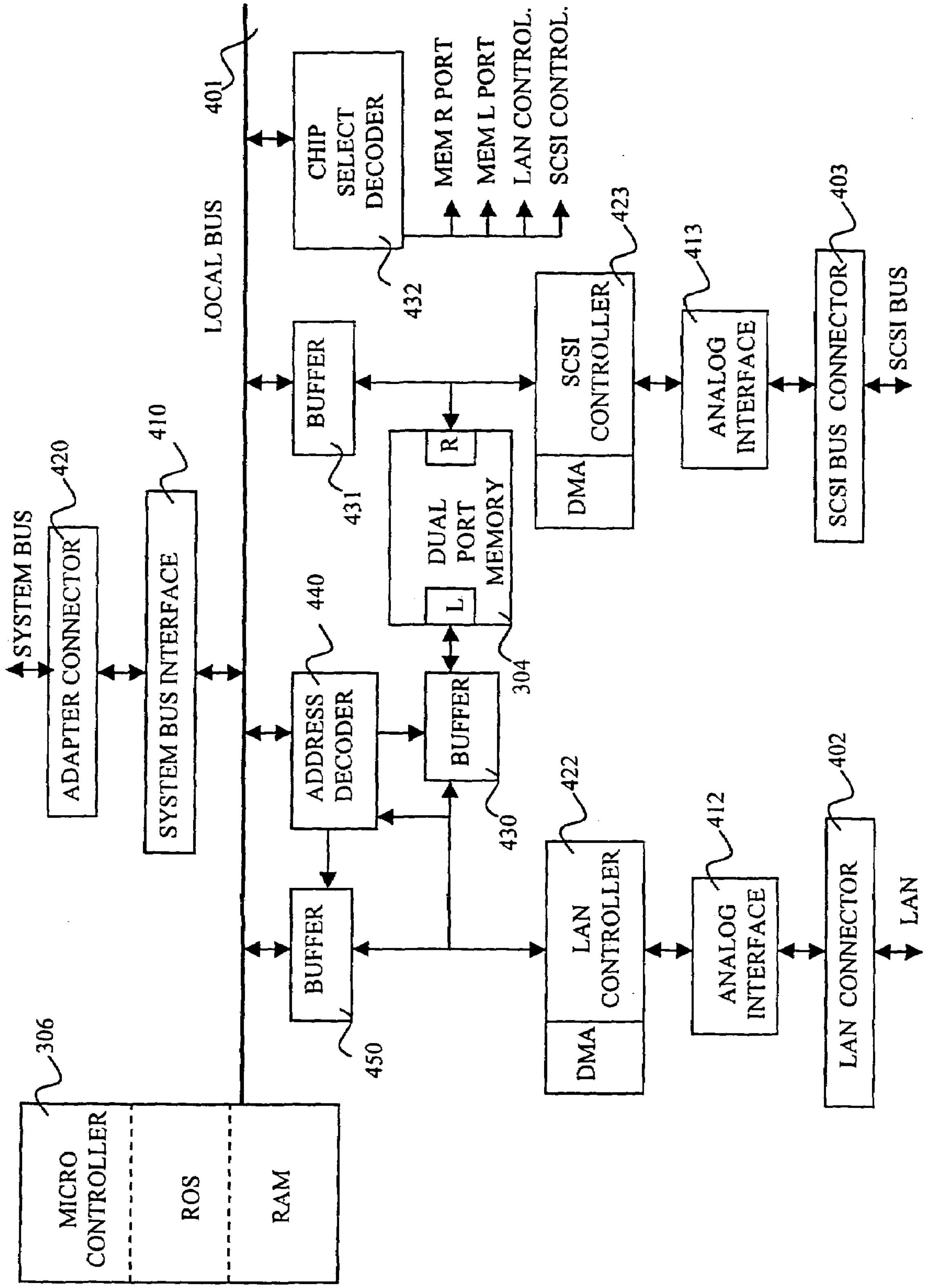
FIG. 4 is a detailed block diagram of the user workstation according to the invention illustrated in FIG. 3.

FIG. 4 is a block diagram representing the hardware architecture of the LAN adapter used in the system according to the invention. Microcontroller 306 is the heart of the adapter. Its internal ROS stores the operation code where resides the port scanning routine and a file transfer protocol.

The system bus logic is made of an adapter connector 420 which allows the connection of the adapter within the workstation and carries the following hardware signals: data bus, address bus, control signals (read, write, byte enables), bus request, bus grant, interruptions, and a system bus interface VLSI 410 which implements the following functions: bus protocol adaptation, bus timing adaptation, address translation, a transmit FIFO to exchange data from the adapter to the main memory, a receive FIFO to exchange data from the main memory to the adapter and a mailbox to allow the communication between the processor and microcontroller 306.

LAN logic unit 302 of FIG. 3 is made of a LAN connector 402, an analog interface 412, a LAN controller 422, a buffer 450 to access local bus 401, a buffer 430 connected to port L of the dual-port memory 304 and an address decoder 440 which controls the operation of the buffers.

SCSI logic unit 303 of FIG. 3 is made of a SCSI connector 403, an analog interface 413, a SCSI controller 423 and a buffer 431 to access local bus 401. SCSI controller 423 and buffer 431 are connected to port R of dual port memory 304. In the preferred embodiment, the SCSI controller 423 of the LAN adapter is a master device on the SCSI bus such as the one located in the SCSI main adapter of the workstation. The two SCSI master devices share the SCSI bus and slaves devices (Hard disk) using known bus arbitration method. There is no performance impact in this architecture as the throughput of current SCSI bus is very high compared to the file transfer throughput.

Chip select logic decoder 432 decodes the address present onto local bus (401). Therefore, both microcontroller 306 and the processor of the workstation can access the peripheral devices. Four chip select signals are generated: the LAN_controller chip select, the SCSI_controller chip select, the memory_right_port chip select and the memory_left_port chip select.

Address decoder 440 generates the control signals for the buffers, the controllers, the dual-port static memory and the system bus interface. Depending on a slave or master access, the following components are enabled:

Buffer 450 and LAN controller 422 are enabled when the address is in the LAN controller slave access area, Buffer 450, buffer 440 and left-port static memory 304 are enabled when the address is in the left-port static memory slave access area, Buffer 431 and right-port static memory 304 are enabled when the address is in the right-port static memory slave access area, Buffer 431 and SCSI controller 423 are enabled when the address is in the SCSI controller slave access area, Buffer 430 and left-port static memory 304 are enabled when the address is in the LAN controller master access to dual-port memory area, Buffer 450 and system bus VLSI 410 are enabled when the address is in the LAN controller master access to main memory area, Right-port static memory 304 is enabled when the address is in the SCSI controller master access to dual-port memory area.

It must be noted that the memory map of microcontroller 306 is composed of 9 address ranges relative to the following component wherein each address range is considered as either slave when microcontroller drives the address out local bus 401 or master when the peripheral device (LAN or SCSI controller) drives the bus: the internal ROS as a slave access, the LAN controller as a slave access, the left-port static memory as a slave, the right-port static memory as a slave, the SCSI controller as a slave, the LAN controller as a master to dual-port memory, (this address range is used by the LAN controller to transfer data to/from the left-port static memory), the LAN controller as a master to main memory, (this address range is used by the LAN controller to transfer data to/from the main memory), the SCSI controller as a master (this address range is used by the SCSI controller to transfer data to/from the right-port static memory), and the internal RAM as a slave.

Figure 5:
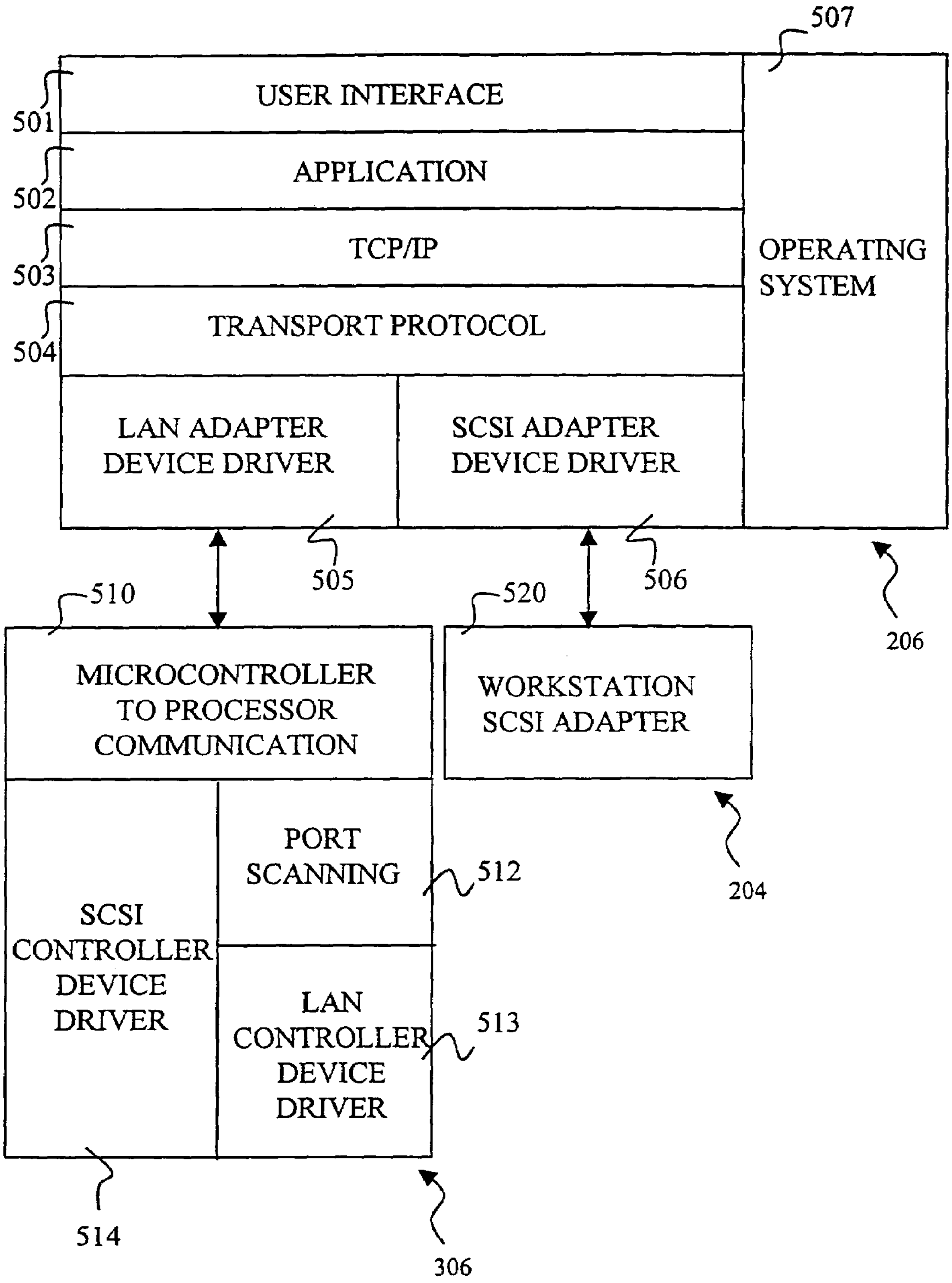
FIG. 5 is the software architecture of the user workstation according to the invention.

As illustrated in FIG. 5, processor 206 runs the following layers: a user interface 501, an application able to activate file transfer 502, a TCP/IP stack 503, a Data Transfer Protocol such as DTP 504, a LAN adapter device driver 505 (this software tasks allow the main processor 206 to communicate with the microcontroller 306), and a SCSI adapter device driver 506.

The microcontroller (306) of the LAN adapter runs the following layers: a communication protocol with the processor 510, a File Transfer Protocol 511, a Port scanning function 512, a LAN controller device driver 513, and a SCSI controller device driver 514. Note that the port scanning function allows to differentiate flows that are handled by the local IP stack (including the file transfer protocol) in microcontroller 306 or flows that are handled by the main IP stack in processor 206. A flow is characterized by at least the source and destination IP address and by the port number.

Figure 6:
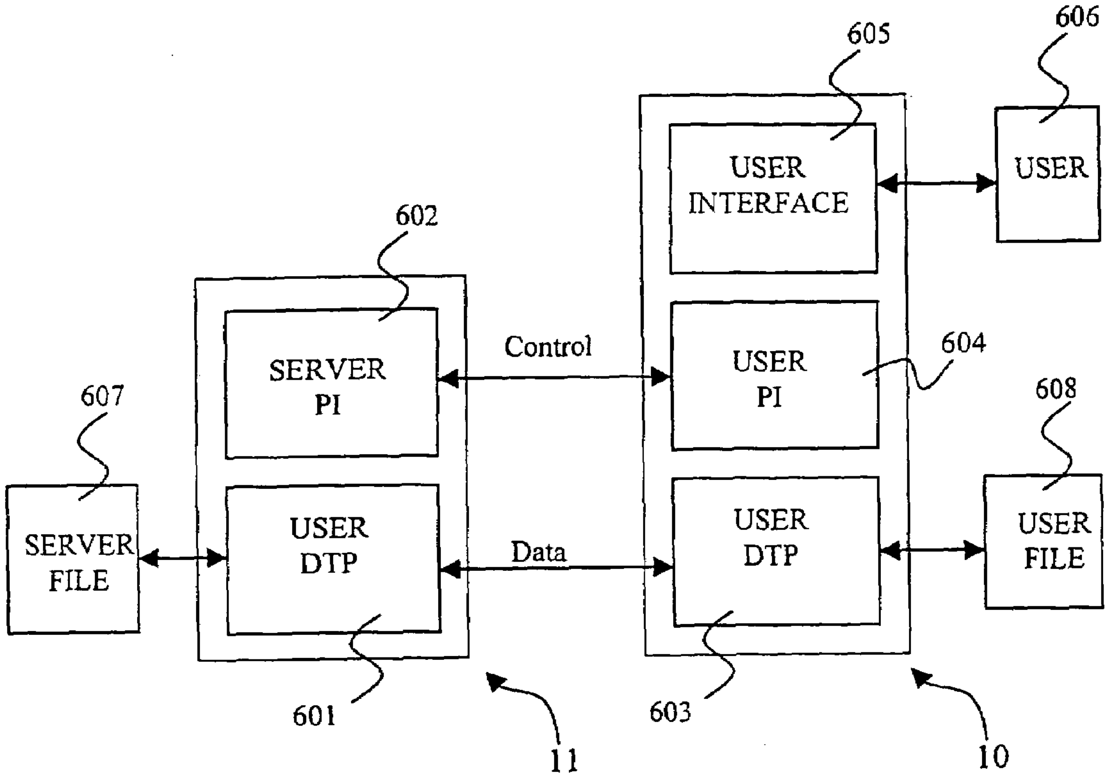
FIG. 6 represents the different software layers in an FTP user/web server application.

In reference to FIG. 6, the file transfer protocol of the web server/user includes two sub-layers called Data Transfer Protocol (DTP) used for managing the data transfer, and a Protocol Interpreter (PI) used as a control protocol. Therefore, the web server runs two different software layers: server DTP 603, user PI 604, and a user interface 605 which allows the user 606 to activate a file transfer between the server file unit 607 and the user file unit 608.

FTP which is used in the preferred embodiment as the file transfer protocol is implemented using the TCP protocol. As shown in FIG. 6, FTP uses separate command and data connections. The Protocol Interpreter (PI) implements the FTP protocol itself while the Data Transfer Protocol (DTP) actually performs the data transfer. The FTP protocol and the data transfer use entirely separate TCP sessions.

Before any FTP application starts, microcontroller (306) initializes the LAN controller DMA with a master address to main memory. Therefore, the LAN controller communicates directly with the processor through the main memory.

When the user runs the FTP application (WS-FTP for Windows), the session starts with a logon procedure and then graphically represents the user and the server by two opposing tables of directories and files. To apply FTP to a file, the user selects it and clicks the direction that he wants the file to be transferred (server to user in the example).

At this time, microcontroller 306 initializes the LAN controller DMA with a master address to dual-port memory (304). Therefore, the LAN controller 302 will store the incoming network data locally.

Data connections are initialized by the server to a port of a user workstation identified in a port_command. The port scanning routine analyses the port_commands coming-in. When the file transfer port_command is detected, microcontroller 306 runs the file transfer routine between LAN controller 302 and SCSI controller 303. LAN controller 422 stores the burst of data in dual-port memory 304 while SCSI controller 423 reads these data to write them on the hard disk through the SCSI bus. These operations take place until the entire file is received. Then, microcontroller (306) informs the processor which alerts the FTP application.

What is claimed is:

1. A system for downloading a data file from a web server to a user workstation through a local area network (LAN) that is connected to the user workstation, the user workstation including a hard disk for storing a data file being transferred over a Small Computer System Interface (SCSI) bus, the user workstation comprising:

a network adapter having:

a dual-port memory for temporarily storing a data file, the dual-port memory having a first, second and third port;

a system bus interface coupling the first port with a system bus in the user workstation;

a LAN logic unit coupling the LAN to the second port of the multi-port memory;

a SCSI logic unit coupling the SCSI bus to the third port of the dual-port memory; and a microcontroller coupled to the dual-port memory, wherein the microcontroller selectively routes incoming data files from the LAN to either the system bus interface or the SCSI logic unit via the dual-port memory, and wherein the microcontroller selectively routes outgoing data files from the hard disk to the SCSI bus to the SCSI logic unit to the dual-port memory to the LAN logic unit to the LAN, thus bypassing the system bus interface of the user workstation when sending data files from the hard disk to the LAN.

2. The system of claim 1, wherein the microcontroller locally stores a listing of address sources, address destinations and port numbers that authorize the data file to be routed directly to a non-volatile memory in the system.

3. The system of claim 1, wherein the system subsequently alerts a File Transfer Protocol (FTP) application of a location of a newly stored data file.

4. A method for downloading a data file from a web server to a user workstation through a local area network (LAN) that is connected to the user workstation, the user workstation including a hard disk for storing a data file being transferred over a Small Computer System Interface (SCSI)

bus, wherein the user workstation further includes a network adapter having a dual-port memory for temporarily storing a data file, the dual-port memory having a first, second and third port; a system bus interface coupling the first port with a system bus in the user workstation; a LAN logic unit coupling the LAN to the second port of the multi-port memory; a SCSI logic unit coupling the SCSI bus to the third port of the dual-port memory; and a microcontroller coupled to the dual-port memory, the method comprising:

using the microcontroller to selectively route incoming data files from the LAN to either the system bus interface or the SCSI logic unit via the dual-port memory, wherein the microcontroller selectively routes outgoing data files from the hard disk to the SCSI bus to the SCSI logic unit to the dual-port memory to the LAN logic unit to the LAN, thus bypassing the system bus interface of the user workstation when sending data files from the hard disk to the LAN.

5. The method of claim 4, further comprising:

using the microcontroller to locally store a listing of address sources, address destinations and port numbers that authorize the data file to be routed directly to a non-volatile memory in the system.

6. The method of claim 4, further comprising:

subsequently alerting a File Transfer Protocol (FTP) application of a location of a newly stored data file.

7. A machine-readable medium having a plurality of instructions processable by a machine embodied therein, wherein said plurality of instructions, when processed by said machine causes said machine to perform a method comprising:

downloading a data file from a web server to a user workstation through a local area network (LAN) that is connected to the user workstation, the user workstation including a hard disk for storing a data file being transferred over a Small Computer System Interface (SCSI) bus, wherein the user workstation further includes a network adapter having a dual-port memory for temporarily storing a data file, the dual-port memory having a first, second and third port; a system bus interface coupling the first port with a system bus in the user workstation; a LAN logic unit coupling the LAN to the second port of the multi-port memory; a SCSI logic unit coupling the SCSI bus to the third port of the dual-port memory, and a microcontroller coupled to the dual-port memory; and using the microcontroller to selectively route incoming data files from the LAN to either the system bus interface or the SCSI logic unit via the dual-port memory, wherein the microcontroller selectively routes outgoing data files from the hard disk to the SCSI bus to the SCSI logic unit to the dual-port memory to the LAN logic unit to the LAN, thus bypassing the system bus interface of the user workstation when sending data files from the hard disk to the LAN.

8. The machine-readable medium of claim 7, wherein the method further comprises:

using the microcontroller to locally store a listing of address sources, address destinations and port numbers that authorize the data file to be routed directly to a non-volatile memory in the system.

9. The machine-readable medium of claim 7, wherein the method further comprises:

subsequently alerting a File Transfer Protocol (FTP) application of a location of a newly stored data file.

* * * * *